June 9, 1931.   P. A. STEPHENSON   1,809,256
MOTOR OPERATED MOTION PICTURE CAMERA Original Filed Jan. 8, 1929   2 Sheets-Sheet 1

Paul A. Stephenson,
INVENTOR.

BY
ATTORNEYS.

June 9, 1931.     P. A. STEPHENSON     1,809,256
MOTOR OPERATED MOTION PICTURE CAMERA
Original Filed Jan. 8, 1929     2 Sheets-Sheet 2
*Fig. 5.*
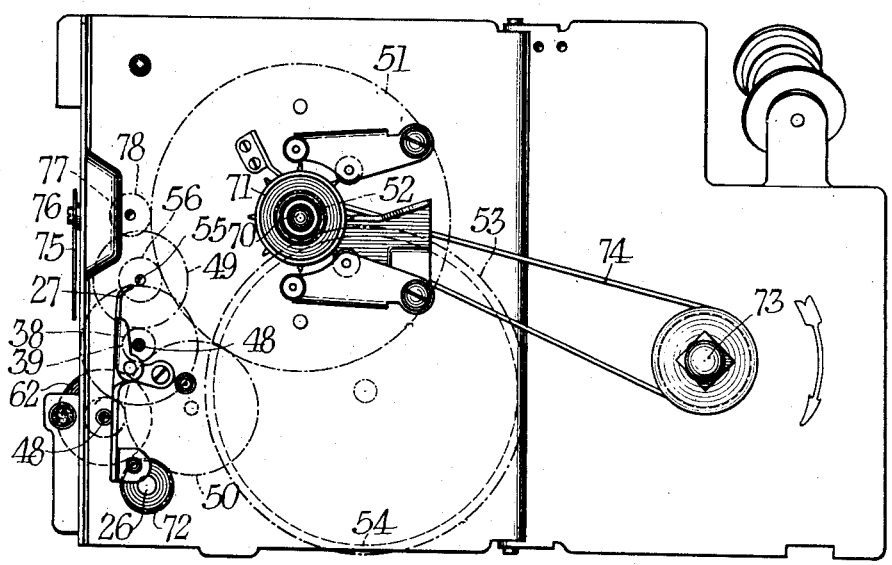
*Fig. 6.*
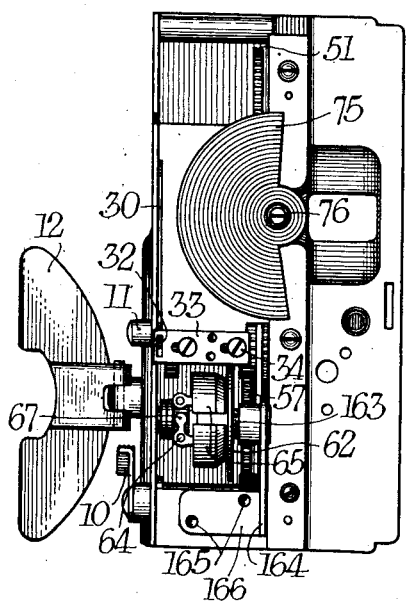
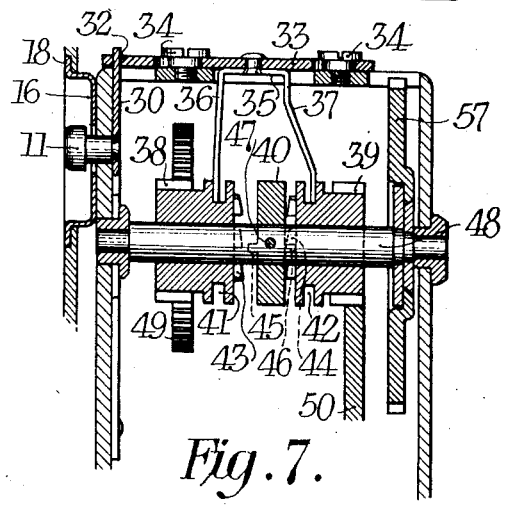
*Fig. 7.*
Paul A. Stephenson,
INVENTOR,
BY
ATTORNEYS.

Patented June 9, 1931

1,809,256

UNITED STATES PATENT OFFICE

PAUL A. STEPHENSON, OF ROCHESTER, NEW YORK, ASSIGNOR TO EASTMAN KODAK COMPANY, OF ROCHESTER, NEW YORK, A CORPORATION OF NEW YORK

MOTOR OPERATED MOTION PICTURE CAMERA

Application filed January 8, 1929. Serial No. 331,111. REISSUED

This invention relates to photography and more particularly to power-operated moving picture machines. One object of my invention is to provide a film-moving mechanism with a plurality of accurately timed speeds which can be automatically obtained. Another object of my invention is to provide a motor for driving a pulldown mechanism together with a suitable gearing for driving the pulldown mechanism at different speeds, the gearing being arranged to normally move the pulldown mechanism at a normal or fixed speed. Another object of my invention is to provide a motion picture machine with a multiple speed motor and with a control button for the motor which must be manually operated to change the motor from a normal speed. Another object of my invention is to provide a power-operated machine in which there is a release trigger and a latching device on the release trigger to hold it in an operative position while a control button is being actuated to operate the mechanism at a speed other than normal. Still another object of my invention is to provide a motor release and control mechanism which are protected against accidental operation; and other objects will appear hereinafter from the following specification, the novel features being particularly pointed out in the claims at the end thereof.

In the drawings wherein like reference characters may denote like parts throughout,—

Fig. 5 is an enlarged side elevation of a camera mechanism plate removed from the camera, the gearing being diagrammatically indicated;

Fig. 6 is a front elevation of the mechanism plate, shown in Fig. 5, removed from the camera; and Fig. 7 is an enlarged detail section through the clutch shaft and associated parts.

For certain purposes it is advantageous to have a plurality of different speeds for motion picture camera work. Such speeds may be used for taking "slow motion" pictures or for taking less than the usual number of exposures per second for color photography. The camera should be arranged, however, to normally run at the usual speed,—that is, sixteen frames per second, since for most purposes this is the most desirable speed.

In accordance with my invention, I have equipped a motion picture camera with a motor and gearing through which the pulldown mechanism may be normally driven at the usual speed of sixteen frames per second and the speed may be altered by pressing a control button, it being necessary to continue the pressure on this control member so long as the extra speed is required. This automatically prevents an operator from accidentally running the camera at a speed other than normal accidentally.

Figure 1:
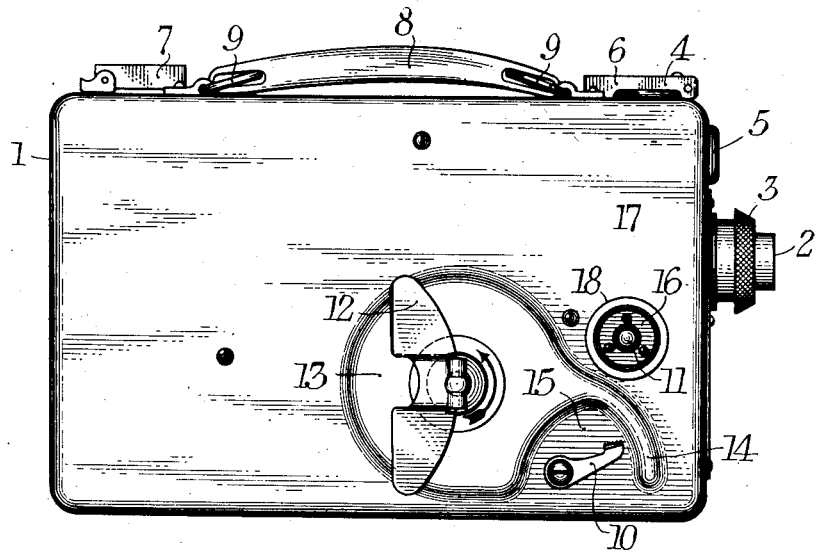
Fig. 1 is a side elevation of a motion picture camera equipped with a multiple speed motor constructed in accordance with and illustrating a preferred embodiment of my invention.

As shown in Fig. 1, as an example of my invention, a motion picture camera 1, of a well known type, may include an objective 2 in a focusing mount 3 and a finder 4 of the reflecting type, mounted on the top wall of the camera to receive an image reflected from a finder lens 5. A direct view finder 6 may be hinged at the top of the camera and a sight 7 for this finder may be hinged at the opposite end. The usual handle 8 is attached to the top of the camera by means of links 9.

So far, the camera is standard construction. In accordance with my invention, the camera may be equipped with a trigger 10, the operation of which releases a motor to drive a pulldown mechanism at a standard speed. If desired, to alter the speed from standard, a push button 11 may be pressed inwardly against spring pressure, thus altering the speed of the pulldown mechanism, as will be hereinafter more fully described.

The camera is preferably equipped with a spring motor and the spring may be placed under tension by means of a winding handle 12. The spring motor is included under the embossing 13 in the camera wall and this embossing is provided with an offset curved member 14 which constitutes a raised guard for the trigger 10, so that the trigger will, in effect, operate in a recess 15 formed by the embossings 13 and 14.

The control member 11 is mounted in a cup-shaped member, the bottom wall of which 16 is countersunk into the side wall 17 of the camera, so that the flange 18 is approximately of the same height as that of the top of the control member, as will best appear from Fig. 7. As the trigger 10 and control member 16 are both protected by their mounting, there is very little likelihood of accidental operation and by laying the camera down on the side 17, neither the control button 16 nor the trigger 10 will be actuated.

Figure 2:
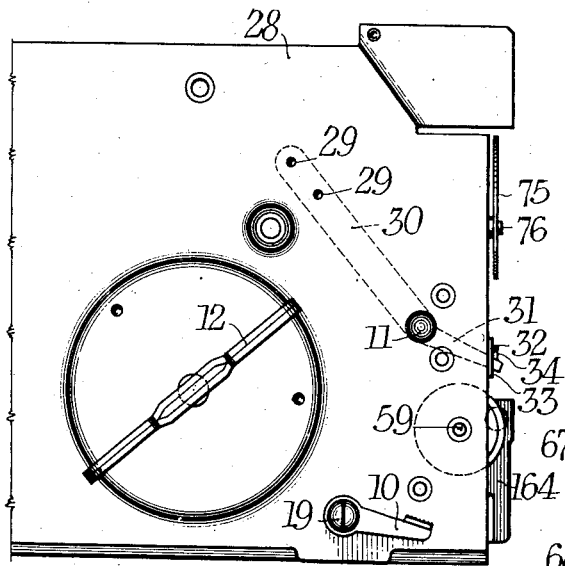
Fig. 2 is an enlarged fragmentary side elevation showing parts of the motor structure removed from the camera casing.
Figure 3:
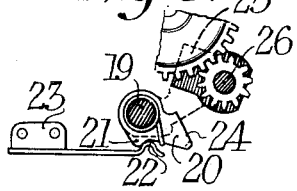
Fig. 3 is an enlarged fragmentary detail, partly in section, of the motor-releasing mechanism.

As shown in Figs. 2 and 3, a trigger 10 is mounted on a shaft 19, which carries a latching lug 20, this lug having a shoulder 21 adapted to snap over a high point 22 of the spring member 23. The position of this spring is such that the trigger 10 may be released to move the lug 24 out of the path of the striker 25 carried by shaft 26, this shaft operating the pulldown mechanism 27, as shown in Fig. 5. The pulldown mechanism may be a claw of any standard construction.

When the pulldown is operated through gearing which will be hereinafter more fully described, the striker 25 revolves with the shaft 26 and by moving the trigger upwardly, member 24 will contact with striker 25 and stop the mechanism.

The control member or button 11 is mounted on the mechanism plate 28 by means of rivets 29 which pass through the plate and hold a spring arm 30 to which the button 11 is fixedly attached. Arm 30 has an extension 31 which engages in a slot 32 of the slide 33, this member, as indicated in Fig. 6, being mounted on a pair of studs 34, so that it may slide a limited distance when the spring 30 is flexed. This spring, however, tends to hold the parts in the position in Fig. 6.

The slide 33, see Fig. 7, carries a spring yoke 35 having arms 36 and 37. Each arm is adapted to shift a gear 38 or 39 into contact with a clutch member 40,—that is to say, each of the gears have slots 41 and 42 which are engaged by the ends of the yoke arms. In addition, the gears have teeth 43 and 44 adapted to engage teeth 45 and 46 on the clutch member 40 which is pinned at 47 to a shaft 48, which may be driven by power.

As will also be seen from Fig. 7, gears 38 and 39 have wider teeth than the gears 49 and 50 with which they mesh, so that in shifting these gears, the teeth remain in mesh and do not become disengaged. It should also be noted that when one gear is brought into contact with the clutch member 40, the other gear is moved from such contact and, when so removed, may turn idly upon the shaft 48.

In the present instance, I have equipped the camera with a normal speed and a speed which is subnormal, being particularly adapted for color work where there is either little motion or slow motion only.

If the camera is to be driven at the high or normal speed, the following gears will be employed. Gear 39 may be driven by gears 50, 51, 52 and 53. Gear 53 is carried by a spring housing 54 which rotates when the spring is released by pressing down the camera trigger 10.

When, however, it is desirable to produce a speed which is slower than normal, the following gearing is employed. Gear 38 meshes with gear 49, which is carried by shaft 55 on which there is also affixed a gear 56 driven from gears 51, 52 and 53.

Figure 4:
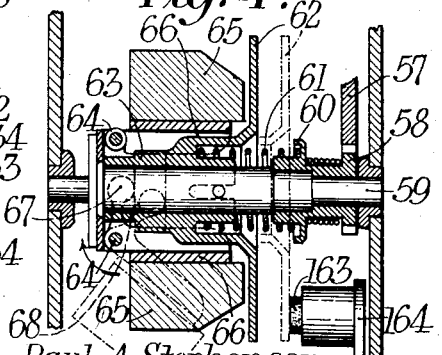
Fig. 4 is an enlarged sectional view through a governor which may be used with a motor constructed in accordance with my invention.

In order to maintain a constant speed, I prefer to employ a governor of the type shown in Fig. 4, this governor being driven from gear 57 (Fig. 7) by means of a pinion 58. Pinion 58 drives shaft 59 and carries a collar 60 adapted to compress a spring 61 when the governor shell 62 is forced from a full-line position to a broken-line position by means of the following mechanism. Flange 62 is carried on a tubular support 63 having pivots 64 for weights 65, these weights being carried on the long arms 66 of bell crank levers pivoted at 64 and having ends 67 adapted to engage a flange 68 on the tubular member 63. As the speed of the governor increases, the weights are thrown from their full-lined positions, causing the bell crank levers to move the flange 62 outwardly until it comes in contact with a friction plug 163 carried by a bracket 164 attached by rivets 165 to a support 166. With a governor arranged as above described, the speed of the governor is substantially the same whether the pulldown mechanism is operated at full speed or at reduced speed. This is an advantage, since it permits the speed to be more accurately obtained and by regulating the speed properly for one of the two speeds, the other must necessarily be accurate.

Gear 51 is carried by a shaft 70 which operates a sprocket 71 for moving the film toward a gate (not shown) through which it is intermittently moved by the claw pulldown 27. The pulldown shaft 26, which operates the claw, is rotated through a pinion 72 which meshes with gear 50. A take-up film spool shaft 73 may be operated through a belt 74 by means of a pulley on shaft 70 (not shown).

A shutter 75 may be mounted upon a shaft 76 which may be operated through the gears 77 and 78, the latter meshing with gear 51. The mechanism used to move the sprocket take-up reel shaft and shutter form no part of my present invention.

Having thus described my invention, what I claim as new and desire to secure by Letters Patent is:

1. In motion picture apparatus, the combination with a pulldown mechanism, of a power drive for the mechanism, a trigger for releasing the power drive, mechanism associated with the power drive adapted to be moved to an operative position for altering the normal speed of the pulldown mechanism, a push button control member for actuating said mechanism, and a casing for enclosing said parts, an embossing on the casing adjacent the trigger and forming a guard therefor.

2. In motion picture apparatus, the combination with a pulldown mechanism, of a power drive for the mechanism, a trigger for releasing the power drive, mechanism associated with the power drive adapted to be moved to an operative position for altering the normal speed of the pulldown mechanism, a push button control member for actuating said mechanism, and a casing enclosing said mechanism, depressions in the casing for the trigger and control member.

3. In motion picture apparatus, the combination with a pulldown mechanism, of a power drive for the mechanism, a trigger for releasing the power drive, mechanism associated with the power drive adapted to be moved to an operative position for altering the normal speed of the power drive, a push button control member for actuating said mechanism, a casing enclosing said mechanism and apertured for the trigger and control mechanism, and a countersunk seat surrounding the control mechanism whereby the control member may lie within said countersunk seat.

4. In motion picture apparatus, the combination with a pulldown, of a power drive therefor, two sets of meshed gears adapted to actuate the pulldown from the power drive, a clutch member adapted to render one set of gears operative at a time, said clutch member including a device adapted to alternately connect one gear of each gear train to a power-driven shaft, and a clutch-operating device extending through a wall of the apparatus in position to be actuated from the outside thereof, and a resilient connection between said clutch-operating device and said clutch.

5. In motion picture apparatus, the combination with a film-moving mechanism, of a power drive therefor, two gear trains adapted to alternately drive the film-moving mechanism from the power drive, a clutch adapted to connect either gear train to a power-driven shaft, a control for operating the clutch including a resilient device between the clutch and control.

6. In motion picture apparatus, the combination with a film-moving mechanism, of a power drive therefor, two gear trains adapted to alternately drive the film-moving mechanism from the power drive, said gear trains each having a slidable gear, a fixed power-driven element, means for engaging a slidable gear with the power-drive element including a slidable member, a resilient member connecting the slidable gear to the slidable member, and a control for operating the slidable member.

7. In motion picture apparatus, the combination with a film-moving mechanism, of a power drive therefor, two gear trains adapted to alternately drive the film-moving mechanism from the power drive, said gear trains each having a slidable gear, a fixed power-driven element, means for engaging a slidable gear with the power-drive element including a slidable member, a control for operating the slidable connection, and a spring adapted to normally hold the control in a predetermined position.

8. In motion picture apparatus, the combination with a film-moving mechanism, of a power drive therefor, two gear trains adapted to alternately drive the film-moving mechanism from the power drive, said gear trains each having a slidable gear, a fixed power-driven element, means for engaging a slidable gear with the power-drive element including a slidable member, a resilient member connecting the slidable gear to the slidable member, a control for operating the slidable member, and a spring tending to hold the control in a predetermined position.

9. In a motion picture apparatus, the combination with film moving mechanism, of a power drive therefor, gear shift mechanism adapted to be connected and disconnected to a power driven element, a housing enclosing said mechanism, a control for the gear shift, a second control for the power drive, a motor, and a handle for storing energy in said motor, the control, second control and the handle all being located on one side of the housing enclosing the mechanism whereby the two control members may be simultaneously operated by an operator.

10. In a motion picture apparatus, the combination with film moving mechanism, of a power drive therefor, gear shift mechanism adapted to be connected and disconnected to a power driven element, a housing enclosing said mechanism, a control for the gear shift, a second control for the power drive, a motor, and a handle for storing energy in said motor, the control, second control and the handle all being located on one side of the housing enclosing the mechanism said housing having raised portions adapted to form guards for the first and second mentioned control members to protect them from accidental operation.

Signed at Rochester, New York, this 3rd day of January, 1929.

PAUL A. STEPHENSON.